Jan. 17, 1956  W. D. TEAGUE, JR., ET AL  2,731,526
ACCELERATION RESPONSIVE SWITCH
Original Filed March 24, 1951
FIG. 1
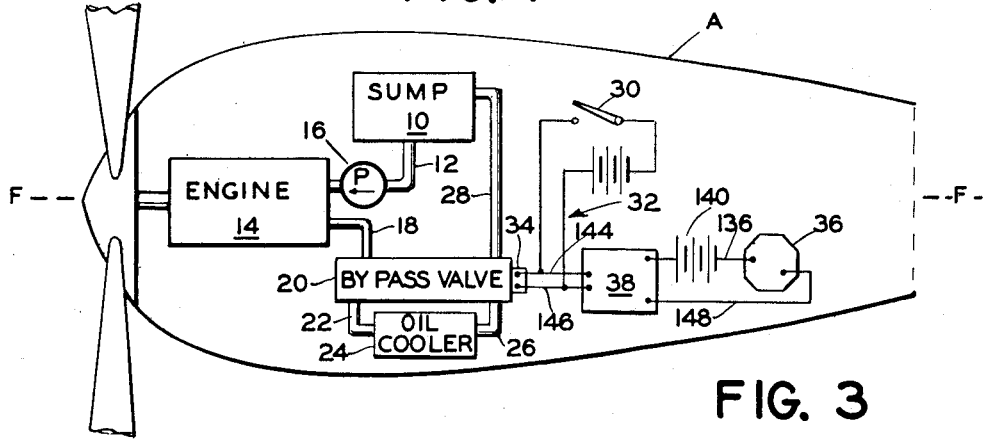
FIG. 2
FIG. 3
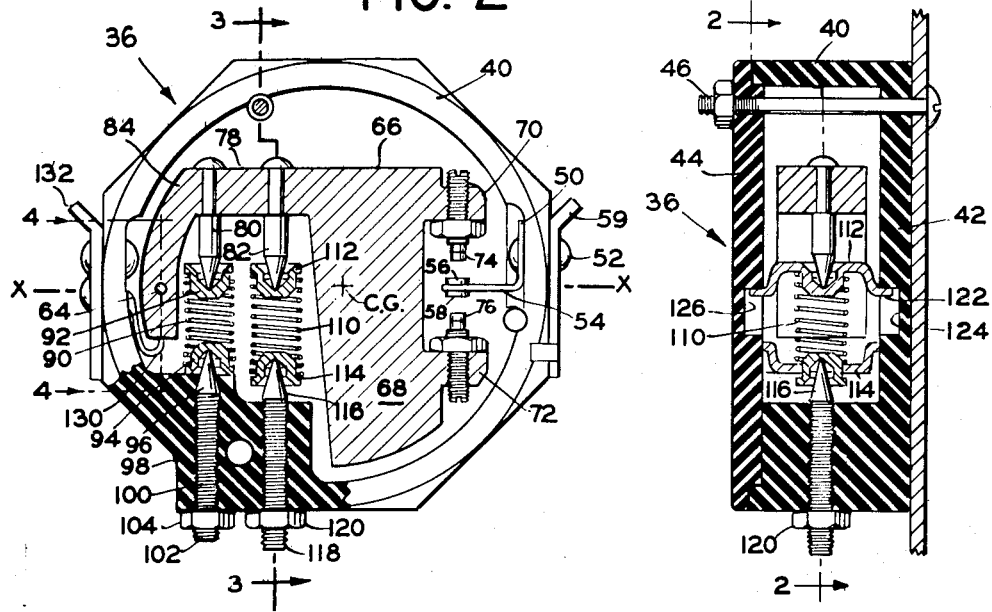
FIG. 4
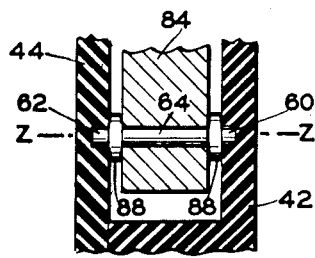
INVENTORS
WALTER D. TEAGUE JR.
HOWARD H. LAUCKS
BY Herbert L Davis
ATTORNEY

United States Patent Office 2,731,526
Patented Jan. 17, 1956

2,731,526

ACCELERATION RESPONSIVE SWITCH

Walter D. Teague, Jr., Alpine, and Howard H. Laucks, Sparta, N. J., assignors to Bendix Aviation Corporation, Teterboro, N. J., a corporation of Delaware Original application March 24, 1951, Serial No. 217,394. Divided and this application March 29, 1952, Serial No. 279,262

7 Claims. (Cl. 200—61.51)

This application is a division of copending application Serial No. 217,394 filed March 24, 1951 now Patent No. 2,720,282, in the name of Walter D. Teague, Jr., and Howard H. Laucks which relates to an engine oil system embodying a protective device for automatically by-passing the oil cooler of the system such as disclosed and claimed in a copending application Serial No. 130,157 filed November 30, 1949, by Walter D. Teague, Jr., and assigned to Bendix Aviation Corporation.

The present invention is directed toward an acceleration responsive means which, although having general utility, is particularly adapted to control the automatic operation of the protective device set forth in the aforenoted application Serial No. 130,157 as utilized in the aforenoted parent application Serial No. 217,394.

The protective device disclosed in application Serial No. 130,157 comprises a valve adapted for inclusion in an engine oil system of an aircraft and which embodies means for sensing the flow of oil to and from the engine oil cooler. In the event the return flow is substantially less than the flow to the cooler, the valve operates to by-pass the cooler.

However, certain movements of an aircraft such as a rapid climb, a recovery from a dive or a sudden upward vertical movement in response to a thermal, produce an acceleration which is termed a positive "G" acceleration; while other movements of an aircraft such as a sudden dive or vertical downward movement due to a down draught produce what is known as a negative "G" acceleration. It has been found that where these negative or positive "G" accelerations are of a relatively high order, a slug of air may become entrapped in the oil lines or conduits of the oil system. Such "G" accelerational forces may cause displacement of the oil at the intake to the engine scavenger pump so that the pump may draw a portion or slug of air into the oil conduit leading to the oil cooler. This air slug when passing through the aforementioned valve causes the automatic by-pass operation thereof since its momentary effect in passing through the valve, is the same as would be produced by a leak in the oil cooler.

To overcome this undesirable operation of the valve, the invention disclosed in the aforenoted parent application Serial No. 217,394 proposes the provision of "G" acceleration responsive means for controlling the actuation of an electronic timing device whereby the automatic operation of the valve due to such an air slug may be momentarily delayed to the end that the air slug may pass through the oil system without causing the automatic operation of the valve and the subsequent by-passing of the oil cooler.

The present invention contemplates and has for one of its objects the provision of a novel "G" acceleration responsive device that is adapted to control the operation of an electronic time device such as is used in the system disclosed in parent application Serial No. 217,394.

The present invention also contemplates an electrical switch embodying a housing carrying electrical contact means and a mass pivotally mounted in said housing and carrying cooperating electrical contact means adapted to engage and cooperate with the first mentioned electrical contact means carried by the housing upon the pivotal movement of the mass in response to "G" accelerations.

Another object of the present invention is to provide means for adjusting the sensitiveness of an acceleration responsive switch to accelerations of predetermined magnitudes.

A still further object of the present invention is the provision of means adapted and arranged to control the actuation of an electrically operated control device in response to "G" accelerations of predetermined magnitudes.

The present invention also contemplates means whereby the operation of a control device carried by an aircraft may be momentarily delayed in response to a change in the acceleration of the aircraft.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for the purpose of illustration only and not to be construed as defining the limits of the invention.

Referring to the drawing wherein like reference characters designate like parts, Fig. 1 is a diagrammatic illustration showing in phantom a side view of an engine nacelle and the instant invention associated with the engine oil system of an aircraft;

Fig. 2 is a section through line 2—2 of Fig. 3;

Fig. 3 is a section through line 3—3 of Fig. 2; and

Fig. 4 is a section through line 4—4 of Fig. 2.

Referring now to the drawing and more particularly to Fig. 1, the reference character A designates an aircraft engine nacelle in which is mounted an engine oil system. The engine oil system comprises a sump 10 connected through a conduit 12 to an engine 14, and a pump 16 operatively positioned in the conduit 14 draws oil from the sump 10 and delivers it to the engine 14. Oil is pumped from the engine 14 by a scavenger pump of conventional type embodied therein through conduit 18 from whence it passes through the by-pass valve 20, conduit 22, oil cooler 24, conduit 26, by-pass valve 20, conduit 28 to the sump 10. Thus, a normal oil circuit, including cooling means for the oil is provided for the engine 14.

The by-pass valve 20 is of a type described and claimed in the copending application Serial No. 130,157 filed November 30, 1949, by Walter D. Teague, Jr., and includes means responsive to the flow of oil to and from the oil cooler 24 so that should a serious leak develop in conduit 22, the oil cooler 24 or conduit 26, the by-pass valve 20 automatically operates to by-pass the oil through the valve 20 to the conduit 28 and thence to the sump 10. Thus, an emergency fluid or oil circuit from the engine 14 to the sump 10 is provided in which the cooling means 24 is by-passed.

In filling the oil system, the initial flow of oil therethrough produces a condition therein that is similar to the condition caused by a leak in the cooling system so that the oil flow responsive control means, hereinbefore described, causes operation of the valve 20 to establish the by-pass circuit hereinbefore set forth. To provide means whereby the oil system may be completely filled, a manually operated switch 30 is suitably connected through an electrical circuit 32 to energize a solenoid operated valve 34. The solenoid valve 34 when so energized is adapted to prevent the automatic operation of the valve 20 to the end that a normal flow of oil through the entire oil system is maintained during the filling operation. In short, the solenoid valve 34 serves to permit a normal flow of oil through the system including the oil cooler 24 under conditions which would usually result in the emergency operation of by-pass valve 20 to by-pass the oil cooler 24.

The specific structure of the automatic by-pass means 29 above set forth, forms no part of the instant invention and reference is made to the aforenoted copending application Serial No. 130,157 for a detailed description of the construction and operation of the various elements thereof.

As hereinbefore set forth, certain movements of an aircraft such as extreme upward or downward movements thereof may produce slugs of air in the oil system tending to cause premature operation of the by-pass valve 20 to establish the by-pass circuit. To utilize the control exercised by the solenoid valve 34 over the by-pass valve 20 to produce, under such extreme flight conditions of the aircraft, a delay in the operation of the valve 20 to the end that the air slug may pass through the oil system without causing the emergency operation of the by-pass valve 20, there is provided an acceleration switch 36 responsive to such extreme upward and downward movements of the aircraft and an electronic timing device 38 electrically associated with the solenoid valve 34 and controlled by the acceleration switch 36. The switch 36 in response to positive or negative accelerations of a predetermined magnitude caused by the aforenoted extreme movements of the aircraft, as hereinbefore set forth, initiates operation of the electronic timing device 38 so as to effect energization of the solenoid valve 34 for a predetermined period so as to prevent the automatic operation of the by-pass valve 20. Thus by delaying the automatic operation of the by-pass valve 20, in response to the flow of oil to and from the oil cooler, the slug of air caused by such extreme movements of the aircraft may pass through the oil cooling system without having the by-pass valve 20 respond thereto.

The specific structure of the electronic timing device 38 per se forms no part of the instant invention and any of the conventional timing devices well known in the art may be used or the same may be of a type such as disclosed and claimed in the U. S. Patent No. 2,444,210 granted June 29, 1948, to John W. Lauricella and assigned to Bendix Aviation Corporation. Operation of the timer 38 is initiated by the closing of the switch 36 and the timer 38 is arranged to effect energization of the solenoid valve 34 during its operation for a predetermined interval of time to delay or prevent the automatic operation of the by-pass valve 20 for such predetermined interval of time. The predetermined period of time during which the electronic timing unit 38 is to energize the solenoid controlling the valve 34 is based of course upon the estimated time required for the slug of air to pass through the oil system after the acceleration condition producing the same has ceased. The timing unit 38 is therefore so adjusted as to effect after operation thereof has been initiated by the acceleration switch 36, the energization of the solenoid controlling the valve 34 for a period of time sufficient to permit the slug of air to pass through the oil system without effecting the automatic operation of the by-pass valve 20.

The hereinbefore described improved engine oil cooling system is set forth and claimed in the aforenoted parent application Serial No. 217,394.

The acceleration switch 36 shown in detail in Figs. 2, 3 and 4, and which forms the subject matter of this divisional application, comprises a housing 40 having an end wall 42 formed integral therewith, and a removable cover plate 44 that is adapted to be mounted on the housing 40. Suitable fastening means, such as bolts 46, pass through the cover plate 44 and end wall 42 to removably secure the cover plate 44 to the housing 40. The bolts 46 also serve as means whereby the switch 36 may be mounted to a supporting structure. The housing 40 and cover plate 44 may be formed of any suitable dielectric material.

A bracket 50 secured to the housing 40 by a rivet or bolt 52 has a lateral arm 54 that extends into the housing 40 and serves to support electrical contacts 56 and 58. Since the housing 40 is of dielectric material, the bolt or rivet 52 is utilized as a conductor to connect the contacts 56, 58 to a terminal bar 59 mounted to the housing 40 by the rivet 52. It is to be noted that the contacts are so positioned as to be substantially equally disposed on each side of the horizontal axis $x$—$x$ of the switch 36.

As shown in Fig. 4, the end wall 42 and cover plate are porvided with cylindrical recesses 60 and 62 respectively, which serve as journals for the opposed ends of a transverse shaft 64. The length of the shaft 64 being so dimensioned that when the cover plate 44 is secured to the housing 40 by the bolts 46, the shaft 64 is secured against side movement between cover plate 44 and the end wall 42. It is also noted, that the axis $z$—$z$ of the shaft 64 is normal to the horizontal axis $x$—$x$ of the switch 36 shown in Fig. 2.

As shown in Fig. 2, the shaft 64 affords means whereby a weight or inertia mass 66 is pivotally mounted for rotation about the axis $z$—$z$ within the housing 40. The weight 66 may be made of any suitable electrical conductive material and comprises a body portion 68 having lateral extensions 70 and 72 adapted to carry adjustable electrical contacts 74 and 76 respectively, an extension 78 having aligned studs 80 and 82, and an arcuate arm 84 that is held in spaced relationship with respect to the body 68 by the extension 78. The arm 84, as shown in Fig. 4, is provided with a bore whereby the weight 66 is pivotally mounted on the shaft 64. As shown in Fig. 4, spacers or washers 88 mounted on shaft 64 and interposed between the weight 66 and the inner surfaces of the cover plate 44 and end wall 42 centrally position the weight 66 on the shaft 64 and prevent any side movement thereof on the shaft 64.

As shown in Fig. 2, the center of gravity C. G. of the weight 66 is located in the body portion 68 thereof, and therefore, is at a point removed from the pivot or shaft 64. It is apparent, therefore, that when the switch 36 is positioned as shown in Fig. 2, the force of gravity acting on the weight 66 tends to rotate it in a clockwise direction about the axis $z$—$z$. This rotation of the weight 66 is resisted in part by a compression spring 90 that is operatively positioned between a cap 92 that engages the stud 80 and a cap 94 that engages a stud 96 adjustably mounted in an extension 98 of the housing 40. The stud 96 is externally threaded as at 100 to engage internal threads formed in the housing 40 and its extension 98. A slot 102 in the head of the stud 96 affords means whereby the stud 96 may be moved relative to the housing 40 to thereby adjust the biasing effect of the spring 90 on the weight 66. A nut 104 threaded on the stud 96 serves to secure the stud 96 in its adjusted position. A second compression spring 110 is operatively positioned between a cap 112 that engages the stud 82 and a cap 114 engaged with a stud 116 that is also adjustably mounted in the extension 98 of the housing 40. The spring 110 also serves to resist the clockwise rotation of the mass 66 about its shaft 64. As shown in Fig. 3 the extension 98 is internally threaded to engage the external threads of the stud 116. A slot 118 in the head of the stud 116 affords means whereby the stud 116 may be moved relative to the housing 40 to thereby adjust the force exerted by the spring 110 on the cap 112 and a nut 120 on the stud 116 locks the stud 116 in its adjusted position. The cap 112 is provided with lateral flanges 122 that are slidably received on slots or recesses 124 and 126 formed in the end wall 42 and cover plate 44, and these slots are so positioned as to prevent any movement of the cap 112 above the horizontal azis $x$—$x$ of the switch 36. It is apparent therefore, that any loading of the spring 110 will not effect the movement of the mass 66 in a counter-clockwise direction above the horizontal axis $x$—$x$ of the switch 36. However, any rotation of the weight 66 that would displace its center of gravity C. G. to a point below the horizontal axis x—x of the switch 36 is resisted by both the springs 90 and 110.

A flexible cable or wire 130 having one end thereof connected to the arm 84 passes through an opening in the wall of the housing 40 and is connected at the other end thereof to a terminal bar 132 secured to the housing 40. Thus, a circuit between terminal bars 59 and 132 is established through the weight 66 and cable 130 upon the engagement of either the contacts 56 and 74 or 58 and 76. Should it prove advantageous to use a dielectric material for the mass or weight 66, suitable electrical leads through the same may be provided to connect the contacts 74 and 76 to the terminal 132.

In order to initially adjust, or set, the switch 36 for response to predetermined negative and positive accelerations, the switch 36 is positioned so as to have the longitudinal axis x—x thereof horizontal. Thus, the switch 36 will be positioned as if it were mounted in an aircraft with the axis x—x of the switch 36 in alignment with the line of level flight of the aircraft. It is apparent, that when the switch 36 is so positioned, the force of gravity acting on the weight 66 will tend to rotate it in a clockwise direction about the shaft 64. The springs 90 and 110 are then adjusted so as to provide a biasing force against the weight 66 that positions the C. G. thereof substantially on the axis x—x of the switch 36. It is to be noted, that it is the sum of the forces exerted by the springs 90 and 110 that balances the weight 66 in this position. However, as hereinbefore set forth, the spring 110 is provided with a cap 122 which operates in recesses 124 and 126 to the end that the spring 110 cannot exert any force against the weight 66 when the C. G. thereof is above the longitudinal axis x—x of the switch 36. Therefore, it is apparent, the spring 90 may be adjusted to exert any desired biasing force and the spring 110 contributes only that force required to balance the weight 66 with the C. G. thereof on the longitudinal axis x—x of the switch 36. The remainder of the force within the spring 110 being operative through the flanges 122 on the cap 112 against the end wall 42 and cover 44. Thus, regardless of the force within the spring 110 due to its compression between the caps 114 and 112, the only force contributed thereby to the balancing of the weight 66 as aforesaid, is the difference between the force exerted by the spring 90 and the total biasing force required to position the C. G. of the weight 66 on the longitudinal axis x—x of the switch 36. Due to this construction and arrangement of parts, the rotation of weight 66 in a counter-clockwise direction on its shaft 64 in response to negative "G" accelerations, i. e., downward movements of the switch 36, is assisted only by the spring 90. Therefore, by varying the force contributed by the spring 90 to the balancing of the mass 66 the sensitiveness of the switch 36 to negative "G" accelerations may be varied. The rapidity of response of the switch 36 to negative "G" accelerations may also be controlled by adjusting the distance between the contacts 58 and 76.

Rotation of weight 66 in a clockwise direction on its shaft 64, in response to positive "G" accelerations, i. e., upward movements of the switch 36, is controlled by both the springs 90 and 110. As hereinbefore set forth, the weight 66 is balanced on longitudinal axis x—x by the combining biasing forces exerted by the springs 90 and 110, therefore, any clockwise rotation of the weight 66 in response to positive "G" accelerations is resisted by these springs. Moreover, while the spring 110 does not effect the counter-clockwise rotation of the mass 66 where the C. G. thereof is on or above the axis x—x, the recesses 124 and 126 permit the compression of the spring 110 by the mass 66 as it rotates in a clockwise direction. It is apparent, therefore, that by varying the force within the spring 110 the resistance thereof to compression by the weight 66 during the clockwise rotation thereof in response to positive "G" accelerations, may also be varied to the end that the switch 36 may be made more or less sensitive to positive "G" accelerations. The rapidity of the response of the switch 36 to positive "G" accelerations may also be adjusted by varying the distance between the contacts 56 and 74.

When the switch 36 has been adjusted to respond to a desired negative and positive acceleration as hereinbefore set forth, it is mounted in the aircraft so as to have the axis x—x thereof parallel to the longitudinal axis of the aircraft and the axis z—z parallel to the lateral axis of the aircraft. The switch 36 is electrically associated with the timer 38 through leads 136 and 148 which connect the terminals 132 and 59 respectively, to the terminals of the timer 38. A power source 140 for the circuit is inserted in the lead 136.

The electronic timer 38 in turn, is connected through leads 144 and 146 to the solenoid valve 34.

Since the axis of rotation z—z of the weight 66 is parallel to the lateral axis of the aircraft and normal to the longitudinal axis of the aircraft it is apparent that linear accelerations or changes in the speed of flight of the aircraft along the line of flight F—F of the aircraft A will not effect the operation of the switch 36. However, upon an upward vertical movement of the aircraft or recovery of the aircraft from a dive effecting a positive "G" acceleration, in excess of the adjusted value of the switch 36, the weight 66 rotates in a clockwise direction about its axis z—z causing contacts 56 and 74 to engage. Operation of the electronic timer 38 is thereby effected and the timer 38 in turn effects energization of the solenoid controlling the valve 34 to cause a delay in the automatic operation of the by-pass valve 20 for the predetermined period of time for which the timer 38 is set.

Therefore, in the event an air slug has formed in the oil system as a result of the positive "G" acceleration of the aircraft, the flow responsive control means of the by-pass valve 20 is prevented from operating the by-pass valve 20 in response thereto to the end that the flow of oil through the normal system is uninterrupted. In the event a leak has developed in the oil cooler, it will be seen that upon deenergization of the solenoid controlling the valve 34 by the timer 38 at the end of the delay period, the valve 20 will operate to establish the by-pass circuit as hereinbefore set forth.

Similarly upon a downward vertical movement of the aircraft effecting a negative "G" acceleration in excess of the adjusted value of the switch 36 the weight 66 rotates in a counter-clockwise direction about its axis z—z causing contacts 58 and 76 to close to initiate operation of the timer 38 for effecting the operation of the solenoid valve 34 hereinbefore described.

It will be apparent from the foregoing that a novel "G" acceleration responsive device is provided wherein the several objects and advantages contemplated by the instant invention have been achieved.

Although only one embodiment of the invention has been illustrated and described various changes in the form, relative arrangement and application of the various elements may be made without departing from the spirit and scope of the invention as will now be understood by those skilled in the art.

What is claimed is:

1. A "G" acceleration responsive switch comprising a housing, electrical terminals carried by said housing, pivot means in said housing, a metallic mass pivotally mounted on said pivot means, spring means operatively associated with said mass whereby said mass is adapted for pivotal movement in response to both negative and positive "G" acceleration, means for adjusting said spring means to thereby vary the responsiveness of said mass to negative and positive "G" acceleration, spaced electrical contacts carried by said mass, a lead connecting said mass to one of the electrical terminals carried by said housing, an electrical contact carried by said housing and connected to the other of said electrical terminals, said last named electrical contact being positioned between the electrical contacts carried by said mass whereby the pivotal movement of said mass in response to negative or positive "G" accelerations engages one or the other of the electrical contacts carried by said mass to the electrical contact carried by said housing to thereby connect the terminals carried by said housing.

2. A "G" acceleration switch comprising a housing, pivot means carried by said housing, a mass pivotally mounted on said pivot means, first and second resilient means engaging said mass and biasing the same against pivotal movement to thereby render said mass sensitive to both negative and positive "G" accelerations of said switch, said first resilient means operative to affect the pivotal movement of said mass in response to both negative and positive "G" accelerations, said second resilient means operative to affect the pivotal movement of said mass only in response to positive "G" accelerations, means for adjusting the effectiveness of said first and second resilient means on said mass during the pivotal movement thereof in response to negative and positive "G" accelerations of said switch, an electrical contact carried by the mass engageable with common electrical contact means carried by the housing upon pivotal movement of the mass in response to positive G accelerations, and another electrical contact carried by the mass engageable with the common electrical contact in response to negative G accelerations.

3. A "G" acceleration responsive switch comprising a housing, an electrical contact carried by said housing, a mass pivotally mounted in said housing, spaced electrical contact means carried by said mass and disposed on either side of said housing contact and adapted to engage said electrical contact carried by said housing, and resilient means engaging said mass and constructed and arranged to render said mass responsive to both negative and positive "G" accelerations of said switch, whereby said electrical contact of said housing is engaged by one of the spaced contacts of said mass in response to negative "G" accelerations of said switch and by the other of the spaced contacts of said mass in response to positive "G" accelerations of said switch.

4. A "G" acceleration responsive switch comprising a housing, pivot means in said housing, a mass pivotally mounted on said pivot means, spaced contact means carried by said mass, resilient means engaging said mass and constructed and arranged to render said mass responsive to both negative and positive "G" accelerations of said switch, and contact means carried by said housing and positioned between the spaced contacts of said mass, whereby the pivotal movement of said mass in response to negative or positive "G" accelerations engages one or the other of the contact means carried by said mass with the contact means carried by said housing.

5. In a "G" acceleration responsive device comprising a housing, pivot means in said housing, and a mass mounted on said pivot means for rotation about said pivot in response to negative and positive "G" accelerations of the device, a plurality of spring means engaging said mass and biasing said mass against rotation in response to positive "G" accelerations, means whereby only one of said spring means aids rotation of said mass in response to negative "G" accelerations, a pair of electrical contacts carried by the mass in opposed spaced relation to one another, and a common electrical contact carried by the housing projecting freely between the contacts and engageable by one or the other of the spaced contacts accordingly as the mass is pivoted in one direction in response to positive "G" accelerations or in the opposite direction in response to negative "G" accelerations.

6. In a "G" acceleration responsive device, the combination comprising: a mass, means pivotably supporting said mass in a housing, a plurality of resilient means engaging the mass against rotation in response to positive "G" accelerations, means whereby only one of said resilient means affects the response of the mass to negative "G" accelerations, an electrical contact carried by the mass engageable with electrical contact means carried by the housing upon pivotal movement of the mass in response to positive "G" accelerations, and another electrical contact carried by the mass engageable with the said electrical contact means in response to negative "G" accelerations.

7. In a "G" acceleration responsive device the combination comprising: a housing, a pivot in the housing, a mass pivotable on the pivot and having its center of gravity disposed to one side of the pivot whereby the mass tends to rotate in one direction about the pivot, a pair of springs engaging the mass and biasing the same against rotation in said one direction thereby rendering the mass responsive to accelerations in said one direction and in a direction opposite thereto, means engaging one of said springs for limiting the biasing effect of said one spring on the mass and whereby only the remaining spring affects the response of the mass to accelerations in said opposite direction, an electrical contact carried by the mass engageable with common electrical contact means carried by the housing upon pivotal movement of the mass in response to positive "G" accelerations, and another electrical contact carried by the mass engageable with the common electrical contact in response to negative "G" accelerations.

References Cited in the file of this patent
UNITED STATES PATENTS

| | | |
|---|---|---|
| 1,845,848 | Richards | Feb. 16, 1932 |
| 2,035,087 | Logan | Mar. 24, 1936 |
| 2,317,982 | Diehl | May 4, 1943 |
| 2,320,505 | Bendar | June 1, 1943 |

FOREIGN PATENTS

| | | |
|---|---|---|
| 171,207 | Switzerland | Nov. 1, 1934 |